July 7, 1970            N. G. ANDERSON            3,519,400
METHOD OF CENTRIFUGAL SEPARATION AND RECOVERY OF CHEMICAL
SPECIES UTILIZING A LIQUID MEDIUM Filed Jan. 25, 1967

INVENTOR.
Norman G. Anderson
BY
ATTORNEY.

INVENTOR.
Norman G. Anderson

United States Patent Office 3,519,400
Patented July 7, 1970

3,519,400
METHOD OF CENTRIFUGAL SEPARATION AND RECOVERY OF CHEMICAL SPECIES UTILIZING A LIQUID MEDIUM
Norman G. Anderson, Oak Ridge, Tenn., assignor to the United States of America as represented by the United States Atomic Energy Commission
Filed Jan. 25, 1967, Ser. No. 612,297
Int. Cl. B01d 9/02, 11/04
U.S. Cl. 23—309    5 Claims

ABSTRACT OF THE DISCLOSURE

A method for separating chemical species from a mixture by centrifugation of the mixture through a liquid density gradient containing chemical reagents arranged in zones within the density gradient to provide a predetermined sequence of chemical treatments is described. The method is based upon the principle that macroparticulate material is caused to sediment in a centrifugal field, while molecular size material in solution is relatively unaffected. Thus, chemically active reagents immobilized in a density gradient can be arranged to provide a preselected sequence of steps in a separation process involving particulate matter. A particularly useful application of the invention is in the separation of mixed colloids. For example, protein mixtures can be precipitated in an upper zone, and separated by sedimentation rate differences, by isopycnic banding, or by resolubilization in a lower zone.

---

Figure 1A:
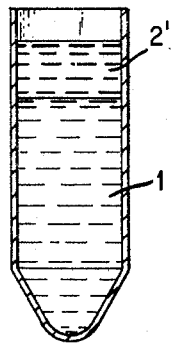

The invention relates to the field of separating and purifying crystallite, colloidal, and macromolecular species utilizing the effects of combining density gradient centrifugation with chemical environmental zones superimposed upon the gradient.

In the prior art many solutions comprise a mixture of solutes where the separation by precipitation of the several chemical species presents a difficult problem because of the occurrence of various phenomena referred to as co-precipitation. These phenomena are in some cases of the nature of adsorption of one species upon another; in other cases the product is of the nature of a solid solution or mixed crystals; while in other cases the product may be the result of inclusion which is a state of mechanical entrapment or aggregation of one species with another. These phenomena are widely known as major hindrances to chemical separations and the final purification of species throughout a wide diversion of chemical operations. This includes heavy chemical processing, fine chemical manufacture, and the production of pharmaceuticals and injectable biological immunizing agents.

Techniques for accomplishing various types of precipitations to form crystallities, flocs, colloids, large crystals, or the like are well known. Most of these depend upon chemical reactions within the suspending medium.

A compartively recently developed method for separating particulates which were considered heretofore as "homogeneous" is that of equilibrium zonal centrifugation. In this method, referred to also as isopycnic separation, a particulate mixture is centrifuged through a liquid gradient of increasing density so that particles are caused to collect or "band" at a depth in the liquid corresponding to their own particular densities. The method, to date, has been utilized chiefly in separating the constituents of biological tissue, which have minute density differences ordinarily undetected and not utilized. The components of a cell homogenate, known as a brei, comprising triturated cells, for example, can be separated by this technique. The method is particularly applicable to the isolation and purification of viruses. For a complete description of the method and of the centrifuges developed for this work refer to National Cancer Institute Monograph 21, The Development of Zonal Centrifuges and Ancillary Systems for Tissue Fractionation and Analyses, U.S. Department of Health, Education, and Welfare, Public Health Service.

Also, in the prior art centrifuge separation of colloidal and macromolecular materials has been limited largely to the control of physical environments of centrifugal field, density of the medium, and mechanical configuration. The advantages of subjecting colloidal materials to chemical reagents in sequence has been entirely lacking in these methods.

SUMMARY OF INVENTION

The present invention is a new method for separating, purifying, and recovering chemical species by combining zonal centrifugation of particles with placement of chemical reagents contained within zones in a density gradient liquid in a predetermined sequence. This combination provides previously unattainable convenience in separation and purification of certain difficultly separable colloids and macromolecular materials.

Figure 1B:
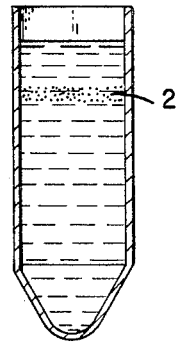
Figure 1C:
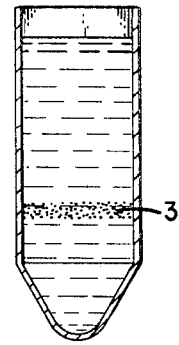
Figure 2A:
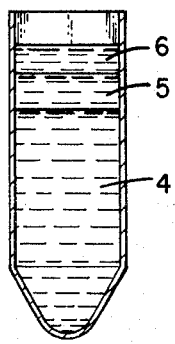
Figure 2B:
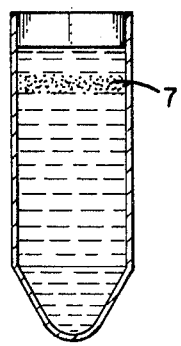
Figure 2C:
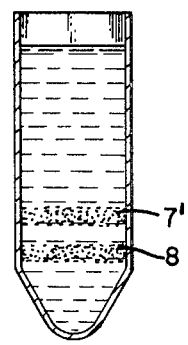
Figure 3A:
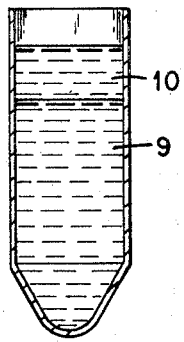
Figure 3B:
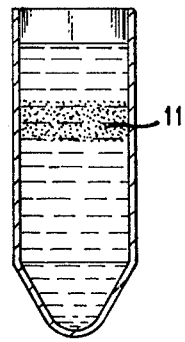
Figure 3C:
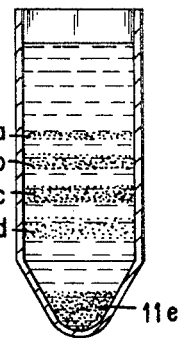
Figure 4:
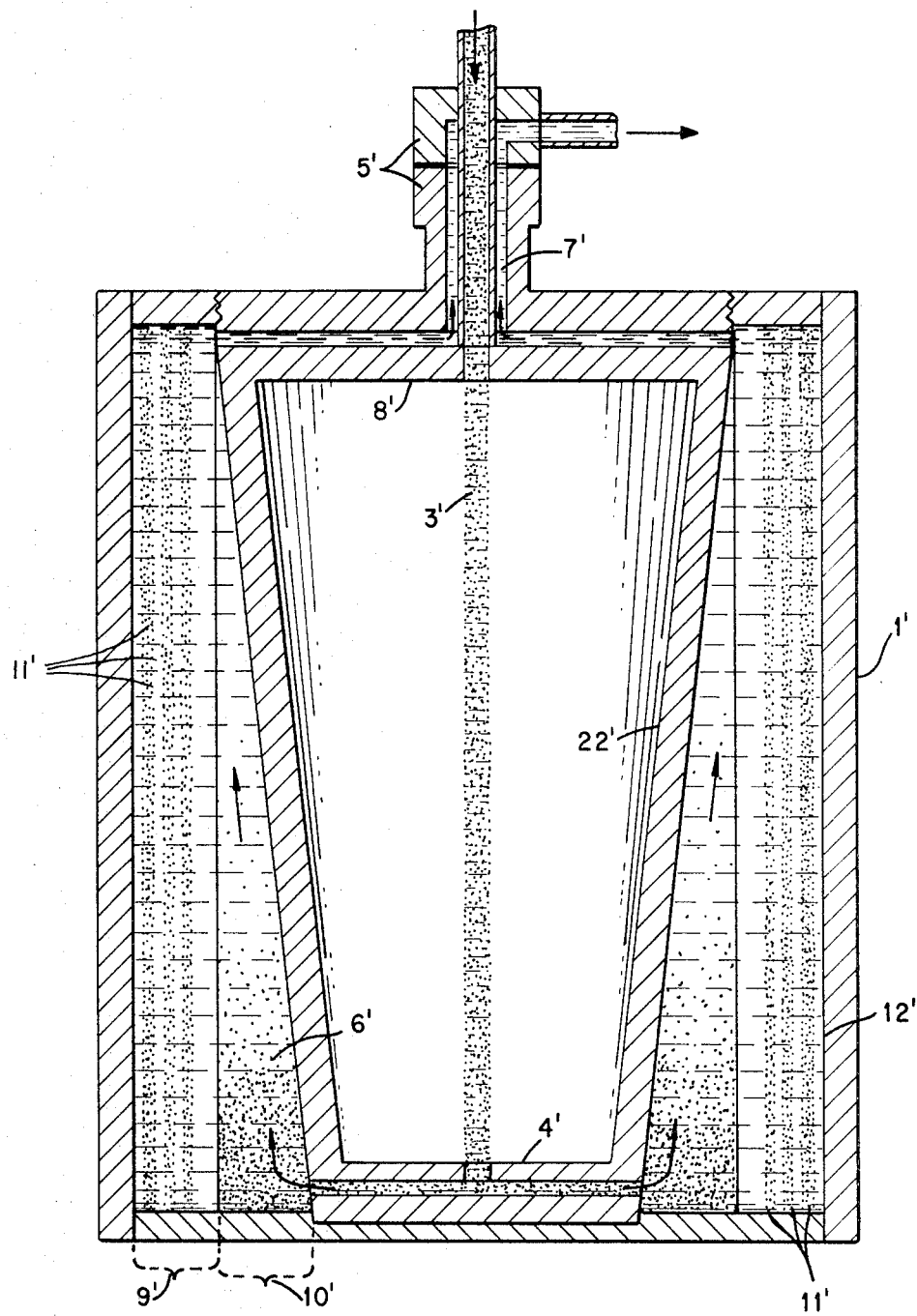

In the drawings, FIG. 1A is an elevation of a centrifuge vessel with a density gradient liquid 1 overlayered with a less dense sample 2. FIG. 1B shows the vessel and contents of FIG. 1A with the sample diffused into the gradient and discrete crystals 2' having formed. FIG. 1C is the vessel and contents of FIG. 1A after centrifuging with the discrete crystals having reached their isopycnic level 3. FIG. 2A is an elevation of a centrifuge vessel containing a non-aqueous liquid 4 of radially increasing density overlayered with an aqueous sample 5 and a non-aqueous precipitant 6. FIG. 2B shows precipitation of the solutes 7 in the aqueous layer following interdiffusion of the overlayers. FIG. 2C shows the vessel and contents with isopycnic separation of precipitated solutes into two bands of insolubles 7' and 8 following centrifugation. FIG. 3A is an elevation of a centrifuge vessel with a non-aqueous gradient 9 and an aqueous overlayer 10 containing a multiplicity of solutes. FIG. 3B is the vessel and contents of FIG. 3A after initial centrifuging and interdiffusion of the aqueous and non-aqueous layers to form an intermediate band of insolubles 11. FIG. 3C is the vessel and contents of FIG. 3B showing isopycnic banding of precipitated species 11a, 11b, 11c, 11d and 11e after final centrifuging. FIG. 4 is a schematic of a bowl-type, continuous-flow centrifuge system for carrying out my process described in greater detail in Example IV.

In my improved process, successive process steps are provided by arranging zones containing chemical reagents in a desired sequence, at various levels in the density gradient. The soluble components within these zones are relatively unaffected by the centrifugal field used, diffusion and convection being the more important transport factors.

The performance of reactions in a centrifugal field in a liquid of graded density having prearranged zone containing chemical reagents permits combining of the known advantages of sedimentation-rate and isopycnic separation with at least two heretofore unrecognized advantages.

(1) Since it is well known that all chemical reactions proceed at a finite rate under specific conditions and that in particular the formation of solids from solution (precipitation or crystallization) proceeds at specific rates, the centrifugal field is utilized, in this invention, to continuously remove microcrystalline material from the reactance environment. This action therefore minimizes the various undesirable phenomena in co-precipitation and thereby provides a substantial enhancement in purity of product.

(2) The provision of sequentially arranged zones containing chemical reagents within a density gradient can permit various steps desired in the formation, purification and recovery of a given product (or products) without the complications involved in ordinary handling procedures. These steps can include precipitation, crystallization, washing in a specific liquid or solution, resolubilization and recrystallization.

The invention can be practiced in a variety of ways, depending upon the nature of the materials to be separated and the desired result. In any case a zone containing chemical reagent (or a series of zones) will comprise a reagent to cause at least one of two general types of phenomena, either precipitation or dispersion. Precipitation as herein referred to can include crystallization, flocculation, coagulation, aggregation, peptization, and the like. Dispersion as herein referred to can include dissolution, particle disintegration, enzymatic digestion, and the like. These may be either selective or nonselective, since separation may occur through either a sedimentation mechanism, a chemical reaction, or through a combination of these.

A sequence of zones containing chemical reagent arranged to effect several chemical treatments can be used in a single gradient. The zones can be narrow bands, wide bands, or chemical gradients. In some cases, it will be of advantage to shape the gradient to a desired concentration profile other than one of constant slope.

A preferred application of the present invention is a separation method for mixed colloids, e.g., proteins, which is the result of combining the effects of differential solubility and density gradient centrifugation in one operation. The method is based upon gradual precipitation of a protein, using an organic solvent, in a centrifugal field. It should be noted that a protein precipitate placed in contact with a given solvent reaches equilibrium more rapidly than does a protein solution to which is added a precipitant. The time for reaching equilibrium is much shorter for very fine flocculated particles than for larger particles.

A technique previously used to concentrate particles in the colloidal range carrying charges has been to increase the molecule-molecule (or particle-particle) interaction by lowering the dielectric constant of the surrounding medium by the addition of organic material. In the case of proteins, the protein-protein interaction is increased by the addition of a simple alcohol and the aggregated particles settle from solution. Very small particles or molecules which cannot easily be pelleted by centrifugation techniques in their normal state can be readily collected when their effective sedimentation coefficient is increased by increasing the interparticle interaction.

The advantage of combining the techniques arises from the coexistence of a dielectric gradient in an inverted relationship with a density gradient. The dielectric gradient permits differential resolubilization of proteins or other macromolecular substance, while the density gradient contributes to the known advantage of increased resolution rate and density equilibrium separation, the combination permitting a substantially higher degree of separation than was previously obtainable.

A number of particles of interest from the point of view of vaccine production, which are too small for effective concentration by the prior art continuous flow centrifugation methods, can be collected by this technique using alcohol or ammonium sulfate to aggregate the protein or subunits in a centripetally located zone and resolubilization in a centrifugally located zone. The method is also applicable to the problem of fractionating cell membranes or ribosomes into their constituent macromolecules. In this instance detergent or salt zones (or gradients) may be employed. Comparatively large particles such as crystallite aggregates or whole cells are introduced at the centripetal end of a density gradient liquid in a centrifugal field. Within the density gradient a dispersing-type reagent is contained. The preferred location of the dispersant in the gradient will depend upon the effect desired.

The dispersant may be located at the centripetal end in a light overlay above the gradient to effect dispersion as a first step; it may be contained in a narrow band at an intermediate level to effect flash dispersion; or it may be contained evenly distributed throughout all levels of the gradient. As the particles are caused to disintegrate, single crystallites, viruses, nucleic acid, macromolecular species, subcellular constituents, or the like may be released which move through the gradient at a rate different from that of the parent particle. These released subparticles may be fractionated on the basis of sedimentation rates, or by banding densities at a convenient preselected location within the gradient, or may simply be left behind the parent particle as a result of a negligible sedimentation rate.

In one variation of practicing the invention, water-insoluble organic substances dissolved in a water-miscible organic solvent may be layered over an organic solvent-aqueous density gradient in which either crystalline or amorphous particles of the organic solids will band. With proper choice of solvents, all levels of the gradient and sample layer may be made denser than water, which is layered over the sample. As water diffuses into the sample layer, precipitation occurs and particles move out through the gradient to their isopycnic levels. Similar systems using water-soluble materials layered over gradients prepared from dense, water-miscible, organic solvents can be employed.

It should be noted that when biological materials of the type indicated herein, and to which this method is of particular application, are handled it is necessary to control the temperature. In most instances low temperatures are desirable.

The method can be practiced using the simplest type of tube or bucket type centrifuge or it may be practiced using a highly developed zonal type centrifuge (see National Cancer Institute Monograph 21, June 1966, pp. 199–215).

The various steps in a preferred procedure for practicing the invention under dynamic conditions in a high speed centrifuge are:

(1) Introducing into the liquid-containable centrifugation vessel aqueous solution of radially-increasing graded density, (2) Superimposing upon the aqueous gradient a radially-decreasing chemical concentration gradient, said liquid also being preselected as capable of causing aggregation of colloidal particles, (3) Adjusting the concentration of the chemical gradient in the centripetal region of the gradient, thus merged, to a preselected concentration to cause aggregation of a particular type of colloidal particles, (4) Introducing a preselected type of mixed-particle suspension at the centripetal surface, (5) Permitting the particles to aggregate differentially on the basis of concentration of aggregating reagent, (6) Permitting the chemically fractionated aggregates to be centrifugally sedimented into the high-aqueous, high density region of the vessel, (7) Optionally, continuing centrifugation until the chemically fractionated, sedimenting colloidal particles collect at levels within the gradient with which they are in density equilibrium, (8) Optionally, immobilizing fractions of relatively high density particles in a resolubilizing zone, and (9) Selectively removing and collecting portions of the gradient and thereby separating constituents thus classified and concentrated therein.

EXAMPLE I

Referring to FIG. 1A, an aqueous density gradient 1 is disposed in a columnar vessel. It is then overlayered with a less dense, water-miscible, non-aqueous solvent 2 containing solutes to be separated. Referring to FIG. 1B, as diffusion occurs discrete crystals 2' appear at some level between pure aqueous and pure non-aqueous phases. During sedimentation the crystals come to rest at their isopycnic level 3, i.e., in the density zone corresponding to the crystal density (FIG. 1C). Increased separation rates and improved resolution is obtainable by centrifugation of the columnar vessel in a swinging bucket type centrifuge, the second liquid being added under either gravity-stabilizing or centrifugal conditions.

EXAMPLE II

This experiment demonstrates the separation of a glucose polymer and a protein. Referring to FIG. 2A, graded density solution 4 containing 2-bromethanol and ethanol and having a top layer density of greater than 1.1 was prepared in a tube used in conjunction with the swinging bucket type centrifuge. An aqueous solution 5 comprising bovine serum albumin and dextran was layered above the solution of graded density. Pure ethanol 6 was layered above the aqueous solution 5. Centrifugation was applied to the tube and its contents. As the ethanol diffused into the aqueous layer precipitation of the solutes 7 occured in the aqeuous layer of FIG. 2B. Referring to FIG. 2C, upon continued centrifugation the precipitate passed downward into gradient, forming two bands of insolubles, the upper being bovine albumin 7' and the lower being dextran 8.

EXAMPLE III

This experiment demonstrates differential banding of water soluble materials in a non-aqueous medium. A density gradient 9 was formed in a centrifuge tube of FIG. 3A using tetrachloroethylene as the heavier component and ethyl alcohol as the lighter. Small volumes of aqueous solutions of grade C deoxyribonucleic acid, trihydroxymethylaminomethane, pectin, sucrose, tartaric acid and disodium ethyleneaminetetraacetate were added at the top at 10. Upon centrifugation an intermediate band 11 was formed as shown in FIG. 3B and on further centrifuging these materials formed definite bands of insolubles in the gradient in the order mentioned at 11a, 11b, 11c, and 11d, as shown in FIG. 3C, but the last two, which were sedimented together, are collected at the bottom of the tube at 11e. The trihydroxymethylaminomethane and the sucrose were not crystallized although banded.

EXAMPLE IV

Utilizing the system of Anderson et al., wherein continuous flow centrifugation is combined with isopycnic banding of sedimented particulates (see NCI Monograph 21, pp. 199–216), a suspension of calf serum proteins was aggregated, sedimented and recovered in three distinct density zones as resolubilized protein fractions. Referring to FIG. 4, a B–IX type core, which is not a part of this invention, is adapted to provide for high-volume, continuous flowthrough of feed liquid centripetal to an imprisoned density gradient of low volume. The rotor comprises a hollow bowl 1', a tapered hollow core 22', a first axial conduit 3' with radial branches 4', communicating through a face seal 5' with outside feed supplying means (not shown) and with a liquid containment cavity 6' inside the rotor, and a second axial conduit 7' with radial branches 8' concentric with the first conduit and commmunciating also through said face seal 5' with outside liquid receiving means and with said liquid containment cavity 6'. An aqueous sucrose gradient 9' increasing in density radially was pumped into the core and established in the centrifugal portion of the liquid containment cavity at a rotor speed of less than 5000 p.p.m. A suspension of calf serum proteins in phosphate buffered saline solution, which was first caused to aggregate by making the medium 70 percent with respect to ethanol, was pumped through the rotor at a rate of 3 liters per hour at a rotor speed of 40,000 r.p.m. (about 90,000×gravity) via the first conduit 3', upward through the centripetal portion of the liquid containment cavity 10' and exiting through the second axial conduit 7'. The aggregated protein particles were thus sedimented into the imprisoned aqueous gradient. When the gradient was recovered (by centripetal displacement with a high density liquid) an optical density tracing of the effluent gradient showed different chemical species at three isopycnic levels 11'. This indicated that the three different chemical species were first banded isopycnically as particles and later resolubilized in the aqueous gradient.

EXAMPLE V

A more highly developed process which utilizes the effects illustrated in Example IV has been used to isolate virus particles and virus subunits for vaccine purposes from large volumes of tissue culture fluid. Alcohol was added to tissue culture fluid from adenovirus-infected cells to a total concentration of 70 percent alcohol on a volume basis in the cold. The slightly turbid solution was passed through a B–IX, continuous flow centrifuge rotor containing a density gradient of sucrose which increased with radius and an alcohol concentration gradient which decreased with radius. The apparatus used was the same as referenced above and shown in FIG. 4. As the particle-containing stream passed over the gradient immobilized in the spinning rotor, virus particles and aggregated virus subunits were sedimented out of the stream and passed into the gradient. The subunits resolubilized at a particular alcohol concentration zone in the gradient and were recovered as a band of high antigenic potency. Complete virus particles passed through the gradient and were pelleted to the peripheral wall 12' of the rotor. Alternatively, a dense sucrose-CsCl solution underlying the gradient has been also used to band the virus particles at their isopycnic level, thus preventing pelletization. Experimental studies with adenovirus type 5 have shown the method to be applicable to large scale virus vaccine production.

EXAMPLE VI

Preliminary studies of the density gradient resolubilization of ethanol-aggregated human ferritin in the swinging bucket centrifuge have indicated that three fractions may be obtained, one of which is pelleted to the bottom of the centrifuge tube. One zone is suggested to be ferritin and the second zone the apoferritin or the protein without the iron.

EXAMPLE VII

Preliminary studies using alcohol precipitated nuclei acids (both ribonucleic and deoxyribonucleic acids together) indicate that nucleic acids can be separated from each other and from other species of the same molecule by gradient resolubilization. Ionic strength, pH, and temperature conditions are important for separation and resolution.

Having thus described my invention, I claim:

1. In a method for separating chemical species contained in a liquid by separation in a centrifugal field, the improvement comprising the steps of introducing into a liquid containable centrifugation vessel a liquid media having a density gradient which increases in the direction of centrifugal force and having zones containing chemical reagents arranged in a preselected sequence along said density gradient, said liquid being subjected in said vessel to a centrifugal force, introducing into said liqiud media arranged in said density gradient a second liquid containing more than one chemical species to be separated while maintaining said centrifugal force, said chemical reagents each being selected to react with at least one of said chemical species, causing by means of said centrifugal force the chemical species of said second liquid to contact sequentially said zones containing said chemical reagents to thereby react therewith and collect the resulting species at different levels within said zones to effect separation, and recovering said resulting chemical species residing in said zones along said density gradient.

2. The method of claim 1 wherein the second liquid is a solution of said species.

3. The method of claim 1 wherein the second liquid contains a colloidal dispersion.

4. The method of claim 1 wherein the precipitating zone comprises a reagent which lowers the dielectric constant of the liquid environment.

5. The method of claim 1 wherein at least one product chemical species is collected in a band by the immobilization in a solubilizing zone.

References Cited

UNITED STATES PATENTS

| | | | |
|---|---|---|---|
| 2,036,924 | 4/1936 | Coutor | 23—269 X |
| 2,165,807 | 7/1939 | Murphree | 23—269 X |
| 2,422,882 | 6/1947 | Bramley | 23—269 |
| 2,854,143 | 9/1958 | Novak | 210—361 X |
| 2,985,305 | 5/1961 | Nock | 210—83 |
| 2,995,612 | 8/1961 | Hervert | 23—269 X |
| 3,075,694 | 1/1963 | Anderson | 210—78 X |
| 3,211,530 | 10/1965 | Harvey | 23—269 X |
| 3,223,484 | 12/1965 | Fisk | 23—230 |
| 3,404,142 | 10/1968 | Shank | 260—112 |

FOREIGN PATENTS 711,252   6/1954   Great Britain.

OTHER REFERENCES

Uni-Tech, Lab World, January 1965, p. 77.

Anderson, National Cancer Institute Monograph 21, pp. 9–24, 1966.

NORMAN YUDKOFF, Primary Examiner

S. J. EMERY, Assistant Examiner

U.S. Cl. X.R.

23—269; 210—361